United States Patent
Caley et al.

(10) Patent No.: US 9,008,642 B2
(45) Date of Patent: Apr. 14, 2015

(54) MOBILE PHONE TO APPLIANCE COMMUNICATION VIA AUDIO SAMPLING

(71) Applicant: General Electric Company, Schenectady, NY (US)

(72) Inventors: Myles D. Caley, La Grange, KY (US); Robert Marten Bultman, Louisville, KY (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 13/743,617

(22) Filed: Jan. 17, 2013

(65) Prior Publication Data

US 2014/0199981 A1  Jul. 17, 2014

(51) Int. Cl.
H04W 4/00 (2009.01)
(52) U.S. Cl.
CPC .................................... H04W 4/001 (2013.01)

(58) Field of Classification Search
CPC ... F41A 17/066; H04L 12/2818; H04L 41/06; H04M 11/007
USPC ................................................... 455/418–420
See application file for complete search history.

(56) References Cited

U.S. PATENT DOCUMENTS

| 2008/0108388 A1 | 5/2008 | Ebrom et al. | |
| 2010/0023938 A1* | 1/2010 | Lee et al. | 717/171 |
| 2011/0156914 A1* | 6/2011 | Sheharri et al. | 340/573.1 |

* cited by examiner

Primary Examiner — Chuong A Ngo
(74) Attorney, Agent, or Firm — Dority & Manning, P.A.

(57) ABSTRACT

The present subject matter relates to systems and methodologies for communicating between an appliance and a mobile device using audio signaling. An appliance is provided with an audio generating device controlled by a processor to cause the audio device to produce encoded sounds. The sounds may correspond to a series of tones. The tones are sampled using the microphone in a smartphone or other mobile computing device and decoded by an application running on the smartphone or device to provide information and/or instructions to the appliance user.

20 Claims, 1 Drawing Sheet

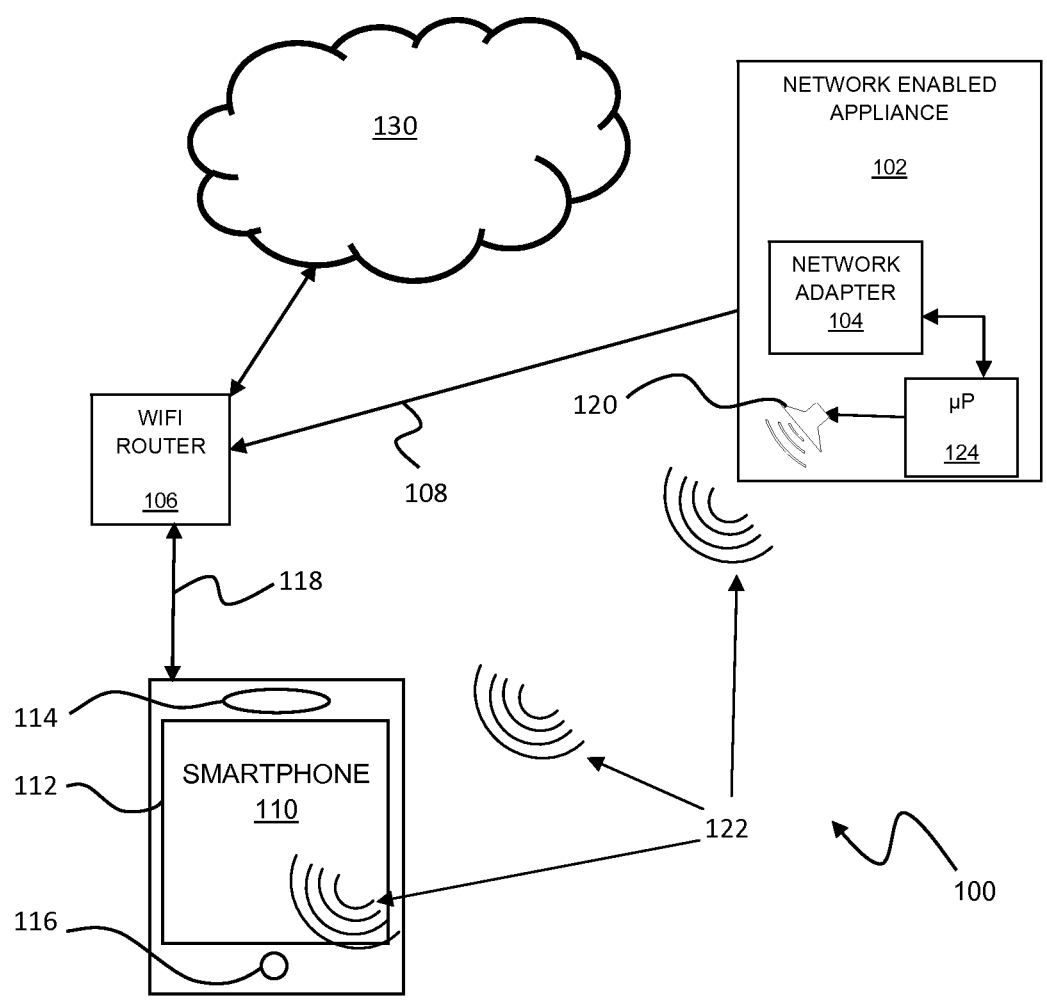

MOBILE PHONE TO APPLIANCE COMMUNICATION VIA AUDIO SAMPLING

FIELD OF THE INVENTION

The present subject matter relates to appliance communications functionality. More specifically, the present subject matter relates to systems and methodologies for providing enhanced communications functionality between an appliance and a consumer.

BACKGROUND OF THE INVENTION

It is fairly common for plural appliances to be installed at a single premise such as a residential home, an office building, or a commercial establishment. For instance, a refrigerator, a microwave oven, a cooking appliance having a stove and/or oven, heating and/or cooling systems can be installed. Modern appliances are more sophisticated than their earlier counterparts, and often include microcontrollers or microprocessors that allow a user greater interaction with the appliance. For example, an appliance can be programmed or reprogramed as well as provide diagnostic information.

The Internet has given rise to worldwide connectivity for many types of devices. However, appliances have traditionally had only standalone capabilities which required operation without cooperation or communication between other devices. As a result, current status information regarding the appliance could not be determined without being physically present at the appliance.

Recently, network adapters have been added to appliances to provide communications between such appliances and a remote device. Often such network adapters are configured to permit appliances to join a customer's home WiFi network to permit communications between the appliances and, for example, an application installed on the customer's smart phone, home or work computer, tablet computer, or other device by which the customer may bi-directionally communicate with the appliance.

In some instances, however, there may be a loss of communications between appliances and, for example, a smart phone application such as in instances where the appliance is transitioning from one WiFi network to another. In such instance it would be desirable to provided alternative forms of communications to permit the appliance to inform a customer's phone immediately when it has joined the new WiFi network or otherwise needs to communicate with the customer in the absence of a normal WiFi connection.

BRIEF DESCRIPTION OF THE INVENTION

Aspects and advantages of the invention will be set forth in part in the following description, or may be apparent from the description, or may be learned through practice of the invention.

The present subject matter relates to an appliance communications system including an appliance having a sound generating device and a processor along with a mobile device having a microphone, a processor, and an output device. In such system the appliance is configured to cause the sound generator to produce an audible signal and the mobile device is configured to sample the audible signal and deliver a message from the output device.

The present subject matter also relates to a communications method for appliances wherein audible signals are generated from an appliance and then sampled so that a humanly perceivable message based on the sampled audio signal may be delivered.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a block diagram of an appliance communications system in accordance with the present subject matter.

Repeat use of reference characters throughout the present specification and appended drawings is intended to represent same or analogous features or elements.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As previously noted, the present subject matter relates to systems and methodologies for providing enhanced communications functionality between an appliance and a consumer. With present reference to FIG. 1 there is illustrated a block diagram of an appliance communications system 100 in accordance with the present subject matter. Generally system 100 includes an appliance 102 that is provided with a network adapter 104. Network adapter 104 may be coupled for communications purposes to a WiFi router 106. As those of ordinary sill in the art will understand, WiFi routers generally provide for both wired and wireless communications connections such as representatively illustrated by connection 108 and either or both such communications connections may be employed for establishing a communications pathway to and from appliance 102.

Further as representatively illustrated in FIG. 1, WiFi router 106 may be coupled to a wide area network (WAN) 130 such as the Internet to provide wide area communications capabilities for appliance 102 as well as any other network connected devices as may be within communications range of WiFi router 106. Such other network connected devices may include other network enabled appliances within or near a premise served by WiFi router 106 or other devices including without limitation, a customer's smartphone 110 that may include, in addition to cellular capabilities, WiFi communications functionality as well, as generally represented by connection 118.

Smartphones, such as smartphone 110 are well understood by those of ordinary skill in the art to have not only cellular communications capabilities for making and receiving voice calls but may also include other cellular capabilities including ability to make and receive SMS messages and, with appropriately installed applications (apps) provide other functionalities such as "surfing" the Internet by an appropriately installed web browser app.

With respect to cellular functionalities, smartphones generally include transceivers and associated microprocessors (not separately illustrated) that make possible use of the smartphone for cellular communications. Such aspects will not be further discussed as, not only are they well understood in the art, but also because such functionalities do not form a part of the present subject matter. In general, however, smartphone 110 includes a display screen 112 that may generally correspond to a touch sensitive device for both input and output (display) of information. Smartphone 110 also includes a speaker (earpiece) 114 used to reproduce sounds including received voice audio and a microphone 116 for converting a customer's spoken words or other audible sounds to electronic signals that may be transmitted for cellular purposes.

In accordance with the present subject matter, additional communication functionality is provided within smartphone 110 by way of a new application (app) for direct communications with appliance 102. In accordance with the present subject matter, appliance 102, that may already include a microprocessor (microcontroller or controller) 124 for providing functionalities associated with network communications capabilities via network adapter 104 as well as other control or display capabilities (not separately illustrated) for operation of the appliance per se, is, per present subject matter, provided with a sound generating device 120 that may be used to communicate with smartphone 110 by way of audio signals, generally 122, generated thereby and received by smartphone microphone 116.

Sound generating device 120 may correspond to a controllable audible alarm device, for example, a piezo electric device, or audio speaker or other device, already associated with appliance 102 or may correspond to a newly installed device. In either instance, in accordance with the present subject matter, in instances where network communications functionality or status via network adapter 104 may have been lost or changed, or, optionally, concurrently with some network communication, sound generating device 120 may be used to provide audible signaling directly to smartphone 110 by way of microphone 116 operating in conjunction with an audio sampling (oversampling) and decoding application installed on smartphone 110.

In accordance with the present subject matter, by performing audio sampling via microphone 116 the phone can then receive simple commands or information from appliance 102. This allows appliance 102 to provide, for example, notifications to smartphone 110 in instances where they are not on the same network or where appliance 102 may have lost all network communications capabilities, be in transition from one network to another, be in the process of establishing an initial network connection, or, in fact, never had obtained any network connection. In this way appliance 102 may immediately notify smartphone 110 that it has joined and/or left a WiFi network or provide some other information and/or command to smartphone 110.

In accordance with the present subject matter, when appliance 102 needs to communicate with smartphone 110 or some other mobile device capable of sampling and processing audio signals, for example, a tablet computer or other mobile device possessing a microphone, processing, and display and/or sound reproduction capabilities, appliance 102 may cause a series of audio tones to be created by way of sound generating device 120. In an exemplary configuration, such audio tones may correspond to an encoded pattern, e.g., Morse code or other, possibly specifically developed, tone encoding that is designed to convey one or more messages to a consumer. The smartphone, upon "hearing" such encoded tones, may then decode such tones by way of sampling or oversampling audio received by microphone 116, to provide a customer perceivable message.

In accordance with the present disclosure, decoding of received audio tones may include conversion of the decoded tones into audible messages relayed to a customer as spoken messages via smartphone speaker (earpiece) 114 and/or to text messages displayed on smartphone display 112. In an exemplary configuration, pre-defined codes may be created and stored in a memory (not separately illustrated) associated with microprocessor 124 corresponding to particular possible messages that might become necessary to be conveyed to a customer. Such codes may be sent singularly or in combinations by way of sound generating device 120 under the control of microprocessor 124 and then decoded by the sampling and decoding application within smartphone 110. In an exemplary embodiment of the present subject matter, such decoding may correspond to employing a look-up table stored in a memory associated with smartphone 110 that may have been created in association for the smartphone stored sampling and decoding application.

It should be understood by those of ordinary skill in the art that while the present subject matter has been described in relation to network enabled appliances, such subject matter is equally applicable to any appliance, whether network enabled or not, with which communications with a consumer is desirable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance communications system, comprising:
   an appliance comprising a sound generating device, a network interface, and a processor; and
   a mobile device comprising a microphone, a processor, and an output device,
   wherein said appliance and said mobile device are configured to connect to a network;
   wherein said appliance is configured to:
      detect a change in a connection status between said appliance and said network; and
      in response to detecting said change in said connection status between said appliance and said network, cause said sound generator to produce an audible signal; and
   wherein said mobile device is configured to:
      sample said audible signal;
      determine a message based at least in part on said audible signal, said message indicating said change in said connection status between said appliance and said network; and
      deliver said message from said output device.

2. A system as in claim 1, wherein said message is an audible message.

3. A system as in claim 1, wherein said message is a voiced message.

4. A system as in claim 1, wherein said output device is a display device and said message is a visual message.

5. A system as in claim 4, wherein said visual message is a text message.

6. A system as in claim 1, wherein said mobile device is a smartphone.

7. A system as in claim 1, wherein said audible signal is an encoded signal.

8. A system as in claim 7, where said encoded signal is based on Morse code.

9. A system as in claim 1, wherein said mobile device is configured to decode said audible signals based on oversampling of said audible signals.

10. A system as in claim 1, wherein said mobile device is configured to decode said audible signals based on a lookup table.

11. An appliance communications method, comprising:
   detecting, by an appliance, a change in a connection status between the appliance and a network;
   in response to detecting the change in the connection status between the appliance and the network, generating, by the appliance, an audible signal;
   sampling, by a mobile device, the audible signal;
   determining, by the mobile device, a humanly perceivable message based at least in part on the audible signal, the humanly perceivable message indicating the change in the connection status between the appliance and the network; and
   delivering, by the mobile device, the humanly perceivable message via an output device of the mobile device.

12. A method as in claim 11, wherein the audible signal is encoded.

13. A method as in claim 11, wherein the humanly perceivable message is an audible message.

14. A method as in claim 11, wherein the message is a voiced message.

15. A method as in claim 11, wherein the message is a text message.

16. A method as in claim 11, wherein the mobile device is a portable computing device.

17. A method as in claim 16, wherein the mobile computing device is a smartphone.

18. A method for providing network status indications from an appliance, the method comprising:
   establishing, by an appliance, a connection to a local area network;
   detecting, by the appliance, that the connection to the local area network has been lost; and
   in response to detecting that the connection to the local area network has been lost:
      obtaining, by the appliance from a memory of the appliance, a pre-defined code corresponding to a message, wherein the message indicates that the connection to the local area network has been lost; and
      emitting, by the appliance, an audio signal containing the pre-defined code.

19. The method of claim 18, further comprising:
   receiving, by a mobile device, the audio signal containing the message;
   employing, by the mobile device, a look-up table stored in a second memory of the mobile device to decode the pre-defined code and obtain the message.

20. The method of claim 19, further comprising:
   displaying, by the mobile device, the message in textual form on a display screen of the mobile device.

* * * * *